Nov. 9, 1965    G. KNIPPERS    3,216,917
APPARATUS FOR THE SEPARATION FROM STEEL OF SURFACE
COATINGS OF NON-FERROUS METALS
Original Filed June 21, 1961    2 Sheets-Sheet 1
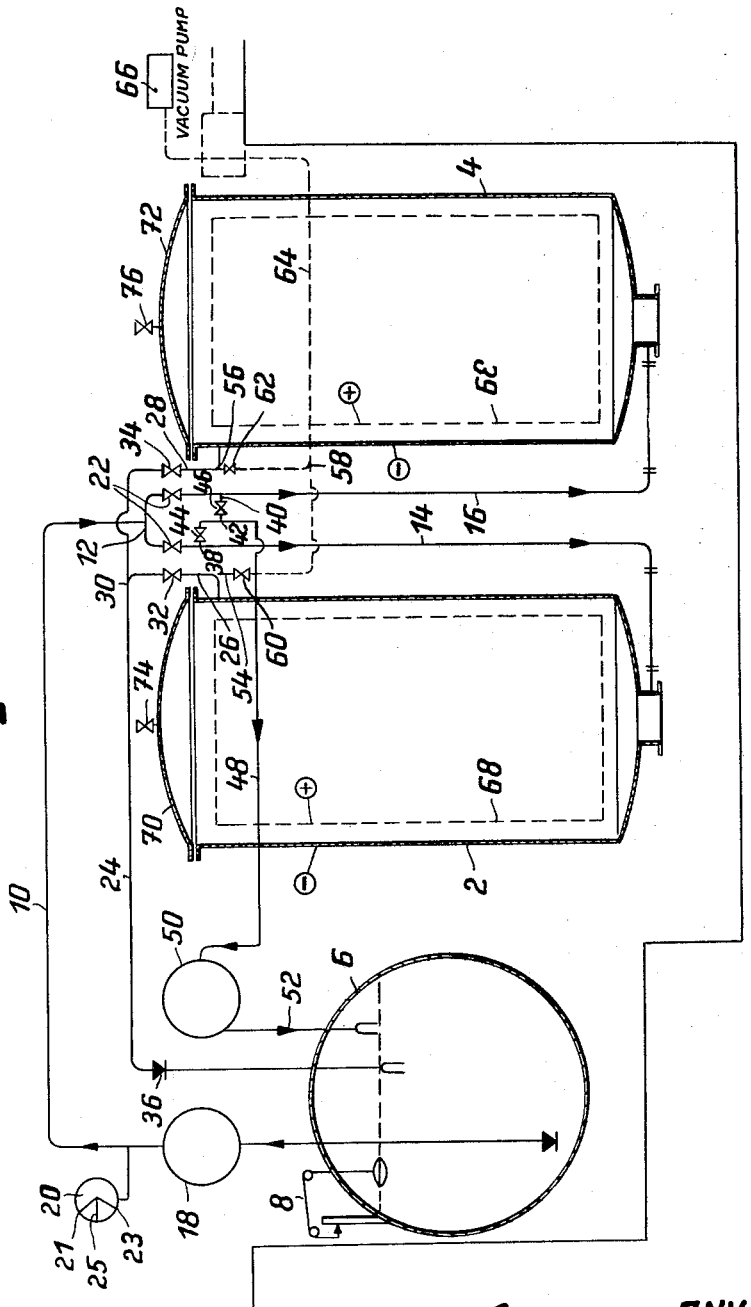
INVENTOR:
Gustav Knippers
By Beaman & Beaman
attys

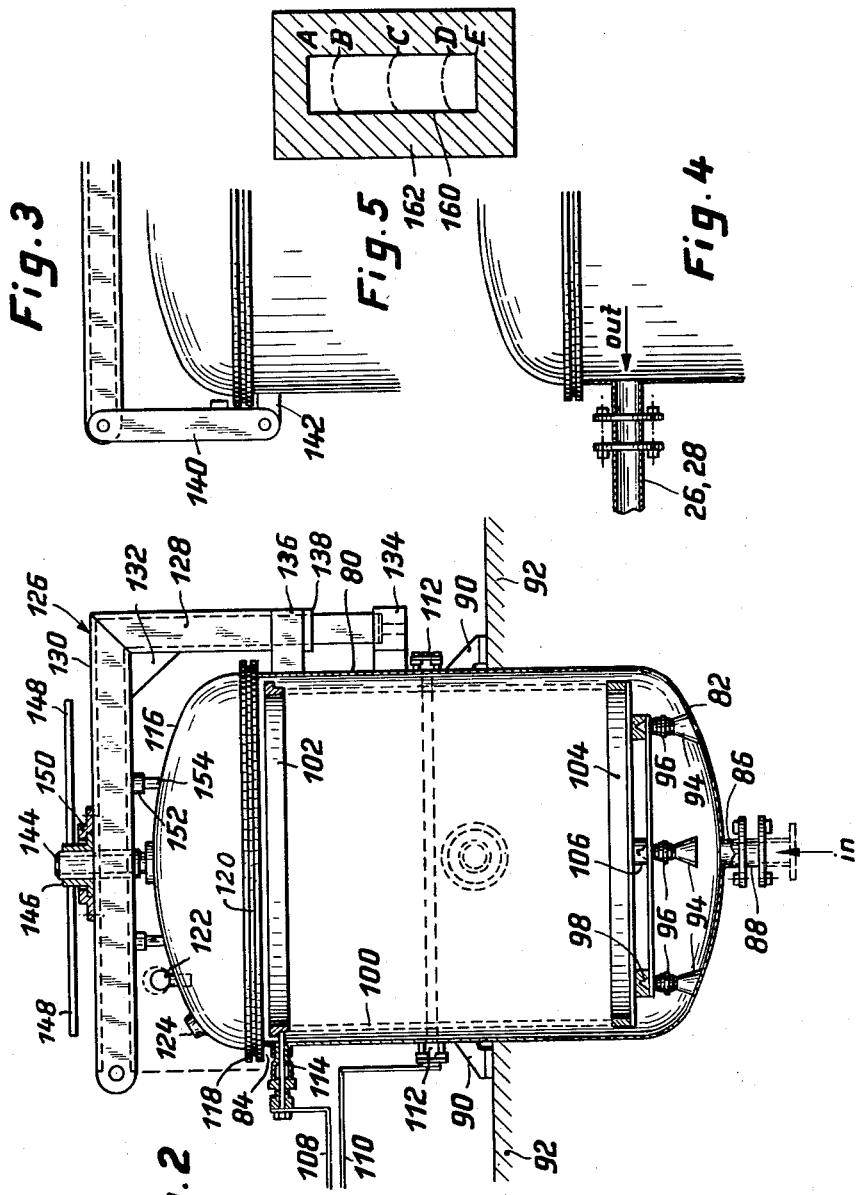

United States Patent Office 3,216,917
Patented Nov. 9, 1965

3,216,917
APPARATUS FOR THE SEPARATION FROM STEEL OF SURFACE COATINGS OF NON-FERROUS METALS
Gustav Knippers, Auf den Saarnberg 18, Mulheim (Ruhr)-Saarn, Germany
Original application June 21, 1961, Ser. No. 127,425, now Patent No. 3,194,750. Divided and this application Sept. 10, 1964, Ser. No. 395,513
Claims priority, application Germany, Jan. 28, 1961, K 42,766
7 Claims. (Cl. 204—236)

This application is a divisional application divided from my co-pending application Ser. No. 127,425 filed June 21, 1961.

The invention relates to an apparatus for the separation from steel of surface coatings of non-ferrous metals, and is particularly applicable to an apparatus for the detinning of tin-plate.

For a long time tin-plate has been a preferred starting material for the production of containers for protecting food. The tin-plate, the steel or other plate of which has been plated, usually electrolytically, by a layer of tin, is formed into food-containers in particularly large quantities so as to meet present requirements.

Since the food containers as a rule can only be used once, the very abundantly accumulated used material contains a large amounts of tin in addition to the sheet steel utilizable in the Siemens-Martin furnace, and for a long time therefore processes have been known which can separate the tin from the steel sheet.

One of the oldest of these processes depends on electrolysis in alkaline solution. By this process the steel sheet to be de-tinned is treated in a 9% sodium lye at 60°–70° C. at a cell loading of 1.5 volts and 1500 amperes.

This proces is subject to a number of disadvantages, which is why it has not been extensively employed. It was then necessary for the material to be-tinned to be placed in the treatment vessel unpressed, whereby the space in the vessel could not be economically used. It was even necesary for the material to be turned over from time to time so that as complete a wetting with treatment liquid of all the material surfaces to be detinned should be obtained as possible and so that polarization of concentration should be prevented. However, when lateral turning the cage the treatment liquid sought the path of least resistance and the wetting as well as the ion movement was thus not obtained.

A further disadvantage was that the treatment vessel was open and due to the high temperature of the treatment bath considerable loss of heat and liquid had to be tolerated. At a treatment temperature of 70° in the course of 24 hours a loss of 5% of liquid was sustained, which in a 300 ton apparatus occasioned the additional use of 2000 litres of heating oil.

A further disadvantage of the old process was that atmospheric carbon dioxide was absorbed, so that much carbonate was formed and thus there was a large consumption of sodium hydroxide and precipitation of stannous ions occurred. The carbonate formed made the treatment fluid unusable very soon, so that this had to be renewed after a very short time. Provision of more calcium as calcium oxide was also extraordinarily complex and necessitated additional plant facilities.

Because of the small utilization of space, several treatment vessels were needed for relatively small yields, into which long current leads and many contacts had to be built in. Thus the current loss was remarkably high so that high current intensities were required. The small space utilisation also caused the amount of work occasioned by the replacement of the anode cages to be too large in relation to the yield. The work in closed rooms in high atmospheric humidity eventually became extremely unhealthy.

Accordingly, it is an object of the present invention to provide a new and improved apparatus for carrying out a suitable process for removing tin, or similar surface coatings from steel plates and the like and at the same time increasing the efficiency and the yield of such a process.

It is another object of this invention to provide an apparatus which may be readily adjusted to receive an electrolytic solution and articles and material to be immersed within said bath, and which may be further adjusted to have a vacuum set up above said articles and material contained in the electrolytic solution.

It is a still further object to provide an apparatus in which means may be readily positioned and adjusted adaptable for subjecting said articles and material immersed in said electrolytic solution to cyclic pressure fluctuation.

Yet another object of the present invention is to provide an apparatus consisting of at least two airtightly closable vessels which are connected to each other and in one installation and which are adjusted to be operated one after the other in order to avoid both vessels having to be opened and attended to at the same time. Thus the expenditure of labour in opening and closing the vessels, changing over the cages and cleaning out the vessels can be further reduced.

The invention has these and other objects all of which will be explained in detail and more readily understood when read in conjunction with the accompanying drawings which illustrate various embodiments whereby the various objects of the invention may be accomplished. It being understood that other arrangements may be apparent without departing from the spirit of the appended claims forming a part hereof.

FIGURE 1 is a schematic representation of a preferred embodiment of an apparatus according to the invention for carrying out the process according to the invention;

FIGURE 2 is a side view partly in section of a treatment vessel;

FIGURE 3 is a side view of an upper part of a treatment vessel;

FIGURE 4 is a side view partly in section of another upper part of a treatment vessel;

FIGURE 5 is a schematic representation to explain the effectiveness of the process according to the invention.

The apparatus of the present invention is generally characterized by at least one airtightly closable vertical treatment vessel 2, a heatable reservoir 6 for a bath liquid e.g. an electrolytic solution, and two pipelines 14 and 16 connecting the vessel 2 with the reservoir 6. In the first line 14 which opens into the lower part of the treatment vessel a pump 18 is arranged to supply liquid to the treatment vessel 2 and in a second line 24 which opens into the upper region of the treatment vessel 2 a pressure throttle device 36 is incorporated to control the pressure towards the reservoir; the second line is connectable between the treatment vessel and the vacuum pump 66. This arrangement allows the liquid to be subjected to a cyclic pressure fluctuation in that the pump is operated in the closed vessel system and the liquid is forced against the throttle device such as said reducing valve or a diaphragm plate. The said cyclic pressure fluctuation may be controlled by means of an adjustable contact pressure gauge. This contact pressure gauge switches off the pump when a predetermined adjustable excess pressure is reached and switches the pump on again when the pressure in the vessel has been released across the throttle device. The frequency of the cyclic fluctuation of pressure is adjusted by means of the setting of the throttle device.

In a preferred embodiment of the apparatus according to the invention there are two treatment vessels. In FIG. 1 two such vessels 2 and 4 are shown schematically, a more detailed illustration of their construction being shown in FIG. 2. The apparatus also comprises a reservoir 6 for the treatment liquid. The reservoir 6 is heatable by suitable means and is also provided with a float mechanism 8 for recording the level of the liquid.

From the reservoir 6 there runs a pipeline 10 which divides at 12 into two sub-pipelines 14 and 16 opening into the lower part of the vessels 2 and 4. If more than two treatment vessels are provided, then a corresponding number of sub-pipelines run from the pipeline 10. The line 10 opens into the reservoir 6 at a comparatively low level; between the reservoir and the junction point 12 a pump 18 and a pressure gauge 20 are connected in series. The pump 18 preferably maintains an output of 400 litres per minute. A valve 22 is inserted in each one of the pipes 14 and 16.

The treatment vessels 2 and 4 are also connected to the reservoir 6 through a second pipeline 24; from the upper region of the vessels 2 and 4 run lines 26 and 28, which combine at 30 and then form the pipeline 24. Valves 32 and 34 are inserted in the lines 26 and 28 respectively before the junction 30. Between the junction 30 and the discharge of the pipeline 24 into the vessel 6 there is inserted in the line 24 a throttle device 36, for example a reducing valve or a diaphragm plate. The pipeline 24 dips from above only a relatively small distance into the reservoir, up to about half the height of the vessel.

Between the valves 22 and the discharge of the lines 14 and 16 into the vessels 2 and 4, lines 38 and 40 branch off, which lines bear valves 44 and 45 before they unite at the point 42 to form the common line 48. The line 48 is the suction line of a pump 50, of which the pressure line 5 opens into the reservoir 6 and only reaches a relatively short distance thereinto. The pump 50 preferably has an output of about 800 litres per minute.

Between the valves 32 and 34 and the departure of the lines 26 and 28 from the treatment vessels 2 or 4 lines 54 and 56 branch off and unite at a point 58. Between the branching-off points from the lines 26 and 28 and the junction point 58 valves 60 and 62 are inserted in the lines 54 and 56. The lines 54 and 56 unite to form the line 64, which leads to a vacuum pump 66.

The cathode of the apparatus is formed from the wall of the treatment vessels 2 and 4, while the anode is constructed in the form of an iron cage which is inserted in the treatment vessels. These cages are indicated on FIG. 1 by the broken lines 68. The treatment vessels have removable covers 70 and 72 in which valves 74 and 76 are provided, discharging to the ambient.

The construction of a single treatment vessel is shown in FIG. 2. The vessel is formed from a vertical cylindrical middle-piece 80, which is fixed to a lower cap 82. A circular flange 84 is attached to the upper end of the middle section 80. The lower cap 82 bears a co-axial entry union to which the pipe 14 or 16 is attached via a plastics joint 88. Brackets 90 are fixed to the sides of the middle-piece 80 and support the vessel on the substrate 92.

Supports 94 are attached to the inside of the lower cap 82 and terminate in insulation pieces 96 and are each provided with a sharp guide piece 98.

The anode cage 100 serves to hold the tin plate or other materials to be treated. The measurements of this cage are so adjusted that it can be placed inside the middle-piece 80, and in its working position the cage nowhere touches the middle-piece. The cage 100 is formed, for example, from bar or sheet iron, and at its upper end is surrounded by a copper hoop 102 while at its lower end there is a circular band 104. Locating elements 106 project from the lower end of the cage; these elements are arranged for engagement with the guide pieces 98 and their shape conforms with the shape of the guide pieces. Preferably, there are three supports 94 spaced at 120° intervals and correspondingly three locating elements 106 are employed, although more supports can be provided if required. The cage may alternatively be suspended from its upper rim by suitable supporting links.

The current for the cathode and the anode is provided via the leads 108 and 110. The lead 110 passes to a copper hoop 112 which surrounds and is fixed to the central portion of the middle-piece 80; this hoop 112 corresponds with the hoop 102 of the anode cage 100. The lead 108 passes through an electrically insulating sleeve 114 in the upper region of the vessel wall, and is connected to the copper hoop 102 of the anode cage.

The leads 108 and 110 are attached to the positive and negative poles of a direct-current generator. If several treatment vessels are provided in one apparatus, the electrodes of the vessels are preferably connected in series. Thus, in the embodiment of FIG. 1 which comprises two autoclaves, the anode cage of one vessel is attached to the positive pole of the generator while the cathode of this vessel is attached to the anode cage of the second vessel and the cathode of the second vessel is connected to the negative pole of the generator.

The treatment vessels are closeable airtightly by means of the lower cap 82 and the corresponding cover 116. The cover 116 bears a flange 118, corresponding to the flange 84, and an airtight washer 120 is arranged between these flanges in a known manner. The cover 116 is pierced by an intake valve 122 and for ease of handling bandgrips 124 are provided.

For the purpose of the airtight closure of the treatment vessels a pressure device is provided for the cover 116. This device comprises a frame 126, which consists of a vertical member 128 and a horizontal member 130. Each of these members is rigidly attached to each other and is reinforced by a bracket 132. The member 128 rests on a thrust bearing 134 and passes through a pivot bearing 136, so that below the bearing 136 a setting ring 138 can be applied against this bearing. The frame 126 is thus moveable away from the vessel; it can be held in its closed position, as is shown in FIG. 3, by means of a locking arm 140 attached to the free end of the frame and mounted on a bearing piece 142 projecting from the vessel wall.

The member 130 of the frame 126 bears a screw 144 which in the closed position of the framework 126 is coaxial with the vessel. The screw 144 co-operates with a nut 146 and the two are fixed together to the capstanbar 148. The nut 146 grips a flange 150 fixed to the member 130. By the swivelling of the bar 148 and thus of the nut 146, the screw 144 moves in the vertical direction, so that by right-hand rotation it bears down on the cover which is thus held fast to the vessel wall. Bushes and bolts 152 and 154 are arranged on the frame 126 and the cover 116 respectively so as to guide the alignment of the parts during rotation of the screw 144.

In FIG. 4, the situation of the union for the pipeline 26 or 28 is shown in relation to the upper edge of the treatment vessel. The attachment between the pipeline and the union is executed in a similar manner at the lower orifice of the vessel.

In use, initially all pumps are switched off, all valves are closed and the treatment vessels are open. The anode cage filled with the material to be treated hangs or stands in the vessel and is joined to the positive pole of the generator or is attached in the previously described series connection.

As the first step, the covers 70 and 72 (see FIG. 1) are closed and then the valves 22, 32, and 34 are opened. The pump 18 is now started; it fills the vessel with the treatment liquid stored in the supply vessel through the pipeline 10 and the pipelines 14 and 16, until by means of the return through the pipelines 26 or 28 and 24 a predetermined level has been attained in the vessels. The valves 22, 32 and 34 are then closed and the pump 18 is disengaged.

The characteristic treatment process now commences: The valves 60 and 62 are opened, the vacuum pump 66 is set in action and a vacuum of about 400 mm. hg. is obtained in the treatment vessels 2 and 4 above the liquid. The valves 60 and 62 are then again closed and the vacuum pump 66 is shut off.

After the application of the vacuum the recurrent change of pressure of the treatment liquid begins and continues during the entire electrolysis process. The valves 22, 32 and 34 are opened, and the pump 18 is started. It again pumps treatment liquid into the vessels and the throttle device 36 acts so that in the system comprising the vessels 2 and 4 an excess pressure builds up which is recorded on the pressure gauge 20. The pressure gauge is provided with an upper contact 21 and a lower contact 23 which can be touched by the pointer 25 of the gauge, whereupon a predetermined control circuit is closed and corresponding relays are actuated. When the pointer 25 of the gauge 20 reaches the upper contact 21, the preset relays deenergize the pump 18. The pressure of the treatment liquid does not thereby rise further; on the contrary, the treatment liquid can be released through the throttle device 36 into the supply vessel 6. Thus the pressure of the treatment fluid again falls, and the pointer 25 eventually reaches the lower contact 23. The relay thereby controlled switches on the pump 18 again, so that treatment liquid is again pumped into the vessels 2 and 4 and the pressure of this liquid in the vessels is increased. This change of pressure of the treatment fluid takes place henceforth recurrently during the entire electrolytic process, and the frequency of the periodical pressure change may therefore be regulated, for example, by means of the adjustable pressure gauge 20.

The electrolytic processes in different vessels of the same apparatus are advantageously displaced at the same time with respect to one another in such a manner that the electrolytic processes are never finished in any two vessels at the same time and only one vessel at a time need be opened and filled with new material to be treated. Accordingly, after the conclusion of the electrolysis in, for example, vessel 2, the appropriate valve 22 and the valve 32 are closed and the valve 74 is opened. The valve 44 is subsequently opened and the pump 50 is switched on, which pumps the treatment fluid back through the pipelines 14, 38, 48 and 52 into the reservoir 6. After complete emptying of the vessel 2, the valves 44 and 74 are again closed and the valve 60 is opened. Subsequently the vacuum pump 66 is switched on and in the entire vessel 2 a vacuum of about 400 mg. hg. is obtained. By means of this vacuum treatment after the electrolytic process, the materials are subjected to an intensive drying; hitherto in using open vessels this drying has had to be carried out in a separate working process in an airtight closeable vessel.

After the vacuum treatment, the valve 74 is opened, and after the release of the vacuum the lid of the vessel is lifted and the treated material removed, the vessel cleaned out, new material inserted and so forth. The operation of the second vessel at the end of the respective electrolytic process is in principle exactly the same as that of the first one; the apparatus is however so arranged that these periods of use must begin first, at the earliest, when the vessel 2 is already again filled, closed and in operation.

The manner of working of the process according to the invention is set out below in connection with a schematic example in conjunction with FIG. 5. In FIG. 5, 160 represents an iron tube, coated with lead or with tin and which is closed above at the upper end and open at the lower end. The tube 160 is placed in the vertical position inside a volume of fluid 162 in a treatment vessel, where it is now subjected in turn to three different kinds of electrolytic treatment, during which it is attached to the positive pole and the treatment vessel to the negative pole of a direct current generator.

In the first case, neither a vacuum treatment nor a subsequent recurrent pressure change of the treatment fluid is applied. Thus, the fluid, by reason of the static pressure of the head of fluid under compression, pushes the air contained in the tube from below up to about mark D inside the tube. The result of the removal of lead or tin coating carried out in this position is that the lead or tin inside the container between the marks A and D is not attacked, but only on the outside of the container and on the inside between the marks D and E. Thus only 55% de-leading or de-tinning is obtained.

In the second case, before the beginning of the electrolytic process the treatment fluid containing the tube 160 is subjected to a vacuum, whereupon at a constant temperature following the Boyle-Mariotte gas law, the air contained in the tube expands and partly comes out from the tube. After normal pressure is again reached (opening of valves 22, 32 and 34 in the apparatus according to FIG. 1) the fluid in the tube forces the air still contained in the tube under compression up to the mark C in the inside of the tube. The subsequent lead or tin removal process has a yield of about 71%.

In the third case, which corresponds with the method of the present invention, after recovery of normal pressure following the vacuum treatment, an excessive pressure is then produced in the treatment fluid which forces the treatment fluid farther up into the container, namely, up to mark B in the tube and substantially, completely wetting the surface to be treated. The pressure in the treatment fluid, in accordance with the invention, is thereafter recurrently reduced and again increased, so that a washing action is obtained in the tube to be de-tinned which, as well as bringing about wetting of the surface, also improves the ion movement. By this process a 92% lead or tinplating removal has been obtained.

From the foregoing description, it will be apparent that there are disclosed structural embodiments which accomplish the objects of this invention. It is a primary feature of advantage that the electrolytic cell, when in use, is completely closed and that the apparatus is readily adaptable to receive articles of various shapes and contours for operations. Modifications and variations in detail will occur to those skilled in the art and it is the intention that the detailed disclosure herein shall be taken as descriptive and illustrative, rather than in a limiting sense.

What I claim is:

1. An apparatus for removing tin, or similar nonferrous metal surface coatings from steel plates, and the like, comprising in combination at least one airtightly closeable treatment vessel having a disconnectable cover, a middle part and a bottom part, the vessel forming an electrolytic cell, a heatable reservoir for the bath liquid, a first pipeline and a second pipeline, the first pipeline leading from the lower part of the reservoir to the bottom part of the vessel, a pump being disposed in said first line, said pump discharging in the direction of the vessel thereby supplying bath liquid from the reservoir to the vessel, the second line connecting the upper region of the middle part of the vessel with the upper part of the reservoir, a pressure throttle device being incorporated in said second line to control the pressure drop therein, and a vacuum pump which is connected to the upper part of said vessel.

2. An apparatus according to claim 1 wherein in the first pipeline a valve is inserted between the pump and the vessel, and in the second pipeline a valve is inserted between the vessel and the pressure throttle device.

3. An apparatus according to claim 1 wherein the connection between the vessel and the vacuum pump branches off from the second pipeline near its offspring at the vessel.

4. An apparatus according to claim 1 wherein the pressure throttle device is a reduction valve.

5. In an apparatus for the separation of nonferrous metals surface coatings from steel parts the arrangement of an even number of airtightly closeable vessels forming electrolytic cells, each vessel having a disconnectable cover, a middle part and a bottom part; a heatable reservoir for the bath liquid, a first pipeline system and a second pipeline system, the first pipeline system consisting of a first pipe starting off from the lower part of the reservoir to a branch point from which first connection pipes are connected to the bottom parts of said individual vessels, a first pump discharging in the direction of the vessels for the supply of bath liquid thereto being incorporated in the first pipe and valves being incorporated in the first connecting pipes, the second pipeline system consisting of a second pipe and second connecting pipes which connect the upper parts of the individual vessels with said second pipe which leads to the upper part of the reservoir, a pressure throttle device being incorporated in said second pipe to control the pressure drop therein, and valves being inserted in said second connection pipes, a vacuum pump being connected to the upper parts of the vessels, a third pipeline system interconnecting the bottom parts of individual vessels and the upper part of the reservoir, a second pump being provided in this third pipeline system for refeeding the bath liquid from the vessel to the reservoir, the individual pipes of said third pipeline being provided with valves for voluntary interruption of the individual connection across said third pipeline system.

6. An apparatus according to claim 5, wherein an adjustable contact pressure gauge is inserted in the first pipe between the pump and the valves.

7. An apparatus according to claim 5 in which the cathode of each electrolytic cell is formed from the wall of the middle part of the vessel while a steel cage arranged in the vessel in insulated relation thereto serves as anode, the electrodes of all vessels being connected in series.

References Cited by the Examiner

UNITED STATES PATENTS

| | | | |
|---|---|---|---|
| 901,266 | 10/08 | Sperry | 204—237 |
| 1,062,966 | 5/13 | Guiterman | 204—275 |
| 2,110,487 | 3/38 | Johnstone | 204—277 |
| 2,719,822 | 10/55 | Kassel | 204—237 |

FOREIGN PATENTS 234,879   8/46   Switzerland.

JOHN H. MACK, *Primary Examiner.*